US012489742B2

(12) United States Patent
Chen et al.

(10) Patent No.: US 12,489,742 B2
(45) Date of Patent: Dec. 2, 2025

(54) SINGLE SIGN-ON FOR REMOTE BROWSING WEB APP

(71) Applicant: Palo Alto Networks, Inc., Santa Clara, CA (US)

(72) Inventors: Yanggui Chen, San Jose, CA (US); Ramanathan Lakshmikanthan, Santa Clara, CA (US); Rakesh Chaitanya Kistigary Nagamaiah, Pune (IN); Ron Alfred Kupferschmied, Ganey Tikva (IL); Aniruddha Avinash Gokhale, Ratnagiri (IN); Abhimanyu Bharat Gite, Pune (IN)

(73) Assignee: Palo Alto Networks, Inc., Santa Clara, CA (US)

( * ) Notice: Subject to any disclaimer, the term of this patent is extended or adjusted under 35 U.S.C. 154(b) by 93 days.

(21) Appl. No.: 18/362,120

(22) Filed: Jul. 31, 2023

(65) Prior Publication Data
US 2025/0047656 A1 Feb. 6, 2025

(51) Int. Cl.
H04L 9/40 (2022.01)

(52) U.S. Cl.
CPC ........ H04L 63/0815 (2013.01); H04L 63/083 (2013.01); H04L 2463/082 (2013.01)

(58) Field of Classification Search
CPC ............... H04L 63/0815; H04L 63/083; H04L 2463/082; G06F 21/41; H04W 12/065
See application file for complete search history.

(56) References Cited

U.S. PATENT DOCUMENTS

| 11,171,942 | B2* | 11/2021 | Chauhan | H04L 63/0815 |
| 2013/0054675 | A1 | 2/2013 | Jenkins et al. | |
| 2023/0123781 | A1* | 4/2023 | Kaimal | H04L 41/0893 726/12 |

OTHER PUBLICATIONS

PCT Application No. PCT/US2024/038639, International Search Report & Written Opinion mailed Oct. 25, 2024, 9 pages.
Atterer, et al., "A Proxy-Based Infrastructure for Web Application Sharing and Remote Collaboration on Web Pages", Interact 2007, LNCS 4662, Part I, pp. 74-87, 2007.

* cited by examiner

Primary Examiner — Thaddeus J Plecha
(74) Attorney, Agent, or Firm — Gilliam IP PLLC (57) ABSTRACT

An architecture has been designed that introduces a "bootstrap server" into the single sign-on flow to bootstrap a SSO context to a remote browsing session. The bootstrap server provides a session token to a client browser to establish and secure a session between the client browser and a remote browsing system. After the client browser obtains a SSO token and is redirected to the bootstrap server, the bootstrap server provides a session token for a remote browsing session. The bootstrap server also generates a response to the client browser to cause the client browser to connect to the remote browsing system to establish a remote browsing session with the session token provided by the bootstrap server. With the remote browsing session, the client browser conveys the SSO token for use by the remote browser.

20 Claims, 5 Drawing Sheets

SINGLE SIGN-ON FOR REMOTE BROWSING WEB APP

BACKGROUND

The disclosure generally relates to transmission of digital information (e.g., CPC class H04L) and network architectures or network communication protocols for network security (e.g., CPC subclass H04L63/00).

The National Institute of Standards and Technology (NIST) special publication 800-207 provides a brief history of the term "zero trust" and explains that zero trust is a "paradigm focused on resource protection and the premise that trust is never granted implicitly but must be continually evaluated." Remote browser isolation (RBI) is a technology to include in a zero trust implementation. Browser isolation uses containerization or virtualization technology to isolate a web browser and browsing activity. RBI provides browser isolation remotely, as a cloud-hosted or cloud-based service. A user interacts with the remote browser via a secure client application or web-based interface which transmits inputs to the remote, isolated browser. The remote browser provides a sanitized rendering of web pages (e.g., pixel reconstruction, document object model (DOM) mirroring, streaming media).

BRIEF DESCRIPTION OF THE DRAWINGS

Embodiments of the disclosure may be better understood by referencing the accompanying drawings.

FIGS. 1-2 are conceptual system diagrams for bootstrapping single sign-on to remote browsing.

FIG. 4 is a flowchart of example operations for managing remote browsing with bootstrapped single sign-on.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

The description refers to a "bootstrap server." The bootstrap server is a communication endpoint that may be hosted on a physical server or a virtual server. The bootstrap server is associated with one or more domains of an organization offering a service to secure remote browsing or RBI with a seamless single sign-on experience.

The description uses the term "token" to refer to data representing context or state of a session. In the case of "SSO token," the term refers to data representing authentication context for an SSO session. In the case of "session token," the term refers to data representing state of an application layer session. Implementation of a token will vary by standard or protocol. For instance, there are different standards for authentication and authorization including OpenID Connect and Security Assertion Markup Language (SAML) 2.0. Different standards and different implementations of standards use different types of tokens (e.g., identity token, access token, refresh token) and different implementations of tokens (e.g., SAML assertion). Regardless of these differences, an SSO token is consumed to validate a digital identity as authenticated and a session token is used to establish and maintain a session.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

OVERVIEW

While remote browser isolation (RBI) can reduce attack surface and further a zero trust implementation, it can disrupt the single sign-on (SSO) experience. For SSO, a token representing authentication of a digital identity ("SSO token") is maintained at the client browser interacting with an identity provider. With RBI, the remote browser will be interacting with service provider endpoints that provide web-based services or applications. The remote browser will interact with these service provider endpoints as directed by the client browser without context of the client browser (i.e., without the SSO token). If re-authentication is triggered, the SSO experience will be disrupted. Furthermore, an authentication scheme that enforces multi-factor authentication (MFA) with local device hardware (e.g., fingerprint scanner) cannot be implemented with RBI.

An architecture has been designed that introduces a "bootstrap server" into the SSO flow to bootstrap a SSO context to a remote browsing session. The bootstrap server provides a session token to a client browser to establish and secure a session between the client browser and a remote browsing system. Trusted relationships are established in advance between the bootstrap server and both the remote browsing system and an identity provider. In addition, the identity provider offering the SSO service is configured to redirect requests to the bootstrap server. After the client browser obtains a SSO token and is redirected to the bootstrap server, the bootstrap server provides a session token for a remote browsing session. The bootstrap server also generates a response to the client browser to cause the client browser to connect to the remote browsing system to establish a remote browsing session with the session token provided by the bootstrap server. After validation of the session token, the remote browsing system or isolation environment provided by the remote browsing system passes the SSO token to a remote browser instantiated within the isolation environment for the remote browser to use in accessing a service endpoint affiliated with the identity provider.

EXAMPLE ILLUSTRATIONS

Figure 1:
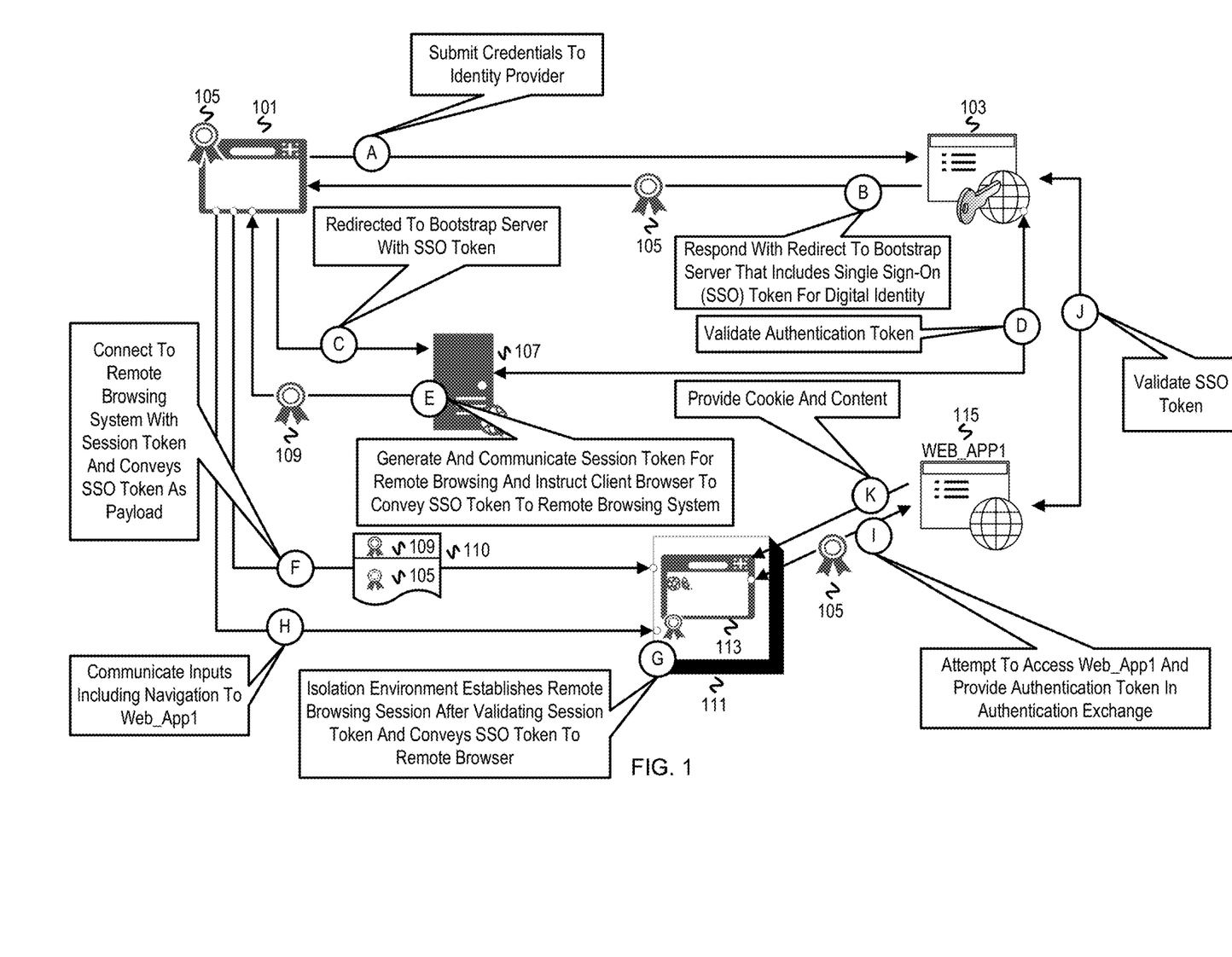
FIG. 1 is a system diagram illustrating conveyance of single sign-on authentication context to a remote browsing session.
Figure 2:
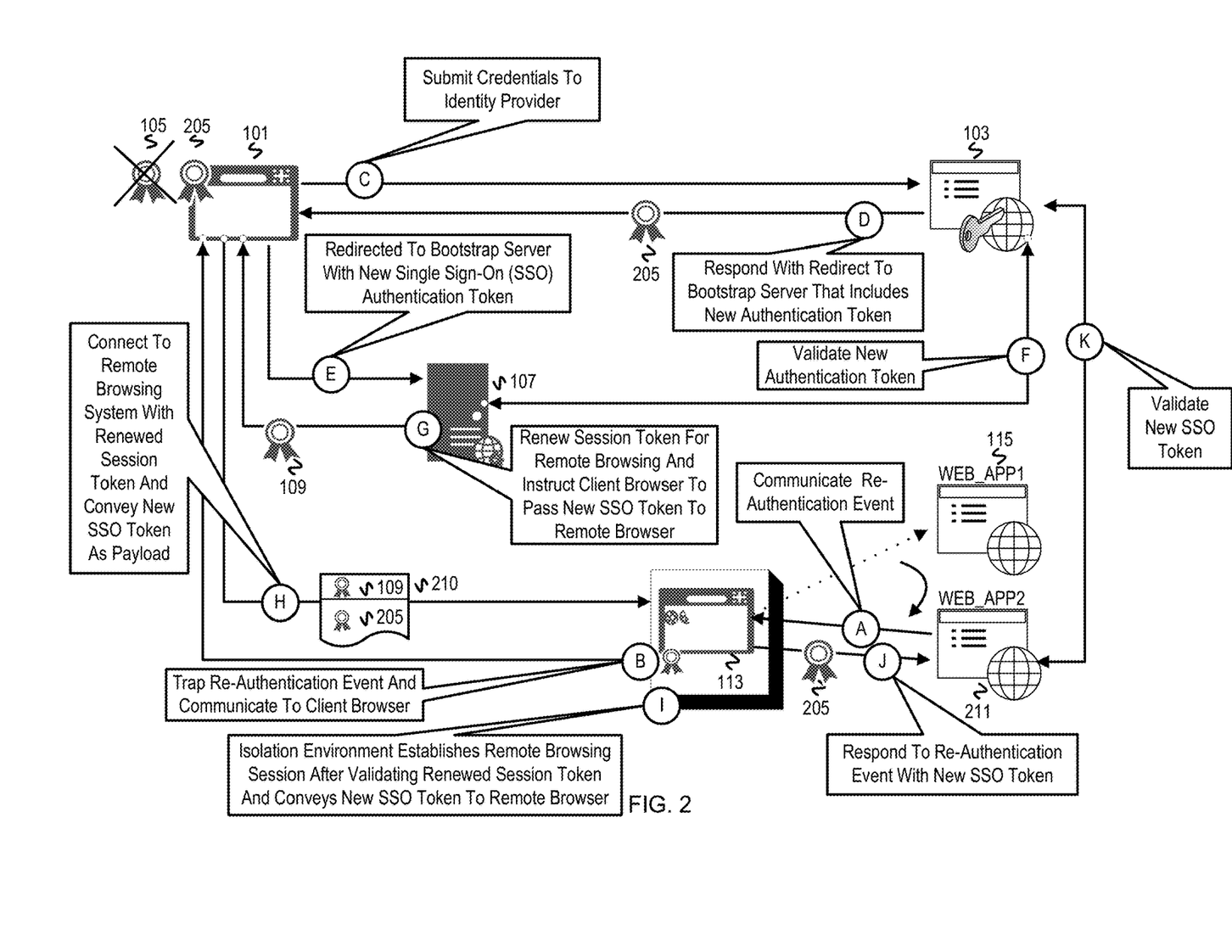
FIG. 2 is a system diagram illustrating handling of a re-authentication event detected at the remote browser 113.

FIGS. 1-2 are conceptual system diagrams for bootstrapping single sign-on to remote browsing. FIG. 1 is a system diagram illustrating conveyance of SSO authentication context to a remote browsing session. It is assumed that trusted relationships have been established between an organization that manages or owns a bootstrap server 107 and a remote browsing system that provides remote browsing as a service.

The remote browsing system has infrastructure for instantiating or provisioning an isolation environment 111 (e.g., container or virtual machine) and instantiating a browser 113 within the isolation environment. As examples, a remote browsing system may be a cloud service provider or an offering of a cloud service platform. The organization that owns/manages the bootstrap server 107 provides a service facilitating the SSO experience into remote browsing while also securing remote browsing. A trusted relationship has also been established between the bootstrap server 107 and an identity provider 103.

FIG. 1 and FIG. 2 are each annotated with a series of letters A-K, each stage of which represents one or more operations. Although these stages are ordered for this example, the stages illustrate one example to aid in understanding this disclosure and should not be used to limit the claims. Subject matter falling within the scope of the claims can vary from what is illustrated.

At stage A, a client browser 101 submits credentials to the identity provider 103. The client browser 101 may be accessing a login portal of the identity provider 103 or have been redirected to the identity provider 103 when attempting to access a protected resource of a service provider that has a relationship with the identity provider 103.

At stage B, the identity provider 103 responds to the client browser 101 with a redirect to the bootstrap server 107. The response includes a single sign-on (SSO) token 105 that provides an authentication context for a digital identity. For instance, the SSO token 105 may be a Security Assertion Markup Language (SAML) assertion. A configuration has been made at the identity provider 103 to enable the redirect. For example, a domain that maps to the bootstrap server 107 is set as the assertion consumer service (ACS) endpoint for the organization corresponding to the client browser 101 and/or corresponding to the digital identity corresponding to the credentials submitted via the client browser.

At stage C, the client browser 101 submits a request to the bootstrap server 107 according to the redirect from the identity provider 103. The redirected request includes the SSO token 105 that provides authentication context.

At stage D, the bootstrap server 107 validates the SSO token 105 with the identity provider 103. As noted earlier, a trusted relationship has previously been established with the identity provider 103.

At stage E, the bootstrap server 107 generates and communicates a session token 109 to the client browser 101. The session token 109 allows the client browser 101 to establish a secure remote browsing session with a remote browsing system that will validate the session token 109. Due to the previously established trusted relationship, the remote browsing system can validate with a key, for example, previously provided by the bootstrap server 107 or another element of the organization that manages the bootstrap server 107. The bootstrap server 107 also instructs the client browser 101 to convey the SSO token 105 to a remote browsing system.

At stage F, the client browser 101 connects to a remote browsing system with the session token 109 and conveys the SSO token 105 as payload. A call to a web application programming interface (API) function or access of a web page may communicate a request to connect to the remote browsing system. In an example that requests the connection with a hypertext transfer protocol (HTTP) message 110, the session token 109 is encoded in a header of the message 110 and the SSO token 105 is conveyed in a body of the message 110.

At stage G, the isolation environment 111 of the remote browsing system establishes a remote browsing session with the client browser 101 after validating the session token 109. If the session token 109 is not valid, then the request to connect would be denied. Also after validating the session token 109, the isolation environment 111 determines that the message 110 includes the SSO token 105 and stores the SSO token 105 into a cache of the browser 113.

At stage H, the client browser 101 communicates inputs to the isolation environment 111. This stage is an example of the general transmitting of inputs from the client browser to the isolation environment. For this illustration, the inputs include inputs to navigate to a service provider endpoint for a web application 115 with identifier Web_App1.

At stage I, the remote browser 113 attempts to access Web_App1. As part of the exchange to authenticate to Web_App1, the remote browser 113 communicates the SSO token 105.

At stage J, Web_App1 validates the SSO token 105 with the identity provider 103. Of course, this presumes that the service provider of Web_App1 has a trusted relationship with the identity provider 103 and has delegated authentication responsibility to the identity provider.

At stage K, Web_App1 provides a cookie and content after validating the SSO token 105. The cookie is provided for maintaining state of the application session between the remote browser 113 and Web_App1.

FIG. 2 is a system diagram illustrating handling of a re-authentication event detected at the remote browser 113. A re-authentication event may be triggered by the service provider endpoint being visited. As an example, a security policy may change or the application session may expire. The re-authentication event may be triggered by navigation to a different service provider endpoint. FIG. 2 depicts the re-authentication event being triggered by navigation to a web application 211 identified as Web_App2. At stage A, Web_App2 communicates the re-authentication event to the remote browser 113. The communication may be a redirect to the identity provider 103.

At stage B, the isolation environment 111 traps the re-authentication event and communicates the re-authentication event to the client browser 101. Since the remote browser 113 is isolated within the isolation environment 111, the isolation environment 111 monitors communications to the remote browser 113 and can detect and trap the re-authentication event. Trapping the re-authentication event prevents the remote browser 113 from acting on the re-authentication event. Assuming the re-authentication event is communicated with a redirected HTTP request, the isolation environment 111 can forward the re-authentication event to the client browser 101. The communication of the re-authentication event includes the uniform resource locator (URL) of the service provider endpoint that generated the re-authentication event. The isolation environment 111 may transmit the redirect request message from the service provider endpoint to the client browser 101.

The subsequent stages of operation C-K in FIG. 2 are similar to the stages A-G, I-J in FIG. 1.

At stage C, the client browser 101 submits credentials to the identity provider 103. The re-authentication event may indicate a multi-factor authentication (MFA) requirement. If the MFA requirement involved a biometric factor, the remote browser 113 would not be able to fulfill the MFA requirement. Since the authentication event with the MFA requirement was trapped and communicated to the client browser 101 rendered at a device presumably proximate to a user, the biometric factor can be provided to the identity provider 103.

At stage D, the identity provider 103 responds to the client browser 101 with a redirect to the bootstrap server 107. The response includes SSO token 205. This could be a renewed version of the SSO token 105 depending upon the validity of the SSO token 105 for the re-authentication.

At stage E, the client browser 101 submits a request according to the redirect from the identity provider 103. The redirected request includes the SSO token 205 that provides authentication context.

At stage F, the bootstrap server 107 validates the SSO token 205 with the identity provider 103. When the client browser 101 submits the request to the identity provider 103, the client browser 101 likely includes a cookie previously provided to the client browser 101. If the cookie is still valid (i.e., the session between the client browser 101 and the bootstrap server 107 is still valid), then the bootstrap server 107 can eschew validation of the SSO token 205.

At stage G, the bootstrap server 107 renews the session token 109 and communicates the renewed session token 109 to the client browser 101. The bootstrap server 107 likely interacts with multiple client browsers and remote browsing sessions. The bootstrap server 107 maintains information for generated session tokens to determine whether the session tokens remain valid and allow renewal of session tokens. The bootstrap server 107 also instructs the client browser 101 to convey the SSO token 205 to the remote browsing system.

At stage H, the client browser 101 connects to the remote browsing system with the renewed session token 109 and conveys the SSO token 205 as payload. The client browser 101 transmits a request message 210 that includes the renewed session token 109 and the SSO token 205. The underlying connection to the remote browsing system may have been maintained or terminated after communicating the re-authentication event at stage B. If the connection was terminated, then the client browser 101 would run code to open the connection again.

At stage I, the isolation environment 111 of the remote browsing system establishes a remote browsing session with the client browser 101 after validating the renewed session token 109. The prior established remote browsing session would have expired. Thus, the request is for a new remote browsing session with the renewed session token 109. The request for the remote browsing session includes the URL of the service provider endpoint that generated the re-authentication event. This can be included in a field of the redirected message sent by the identity provider 103 at stage D. For example, the service provider URL can be in a meta refresh field. Persisting the URL through the bootstrapped re-authentication path allows browsing to continue seamlessly even if the original remote browser 113 and isolation environment 111 were released. However, embodiments may maintain the isolation environment 111 for a time period sufficient for the client browser 101 to respond with the new SSO token 109. In that case, the isolation environment 111 can release the trapped re-authentication event to the remote browser 113 or a new instance of the remote browser 113 after extracting the SSO token 205 from the message 210 and providing the SSO token 205 to the remote browser 113.

At stage J, the remote browser 113 responds to the re-authentication event with the new SSO token 205.

At stage K, Web_App2 validates the SSO token 205 with the identity provider 103.

Figure 3:
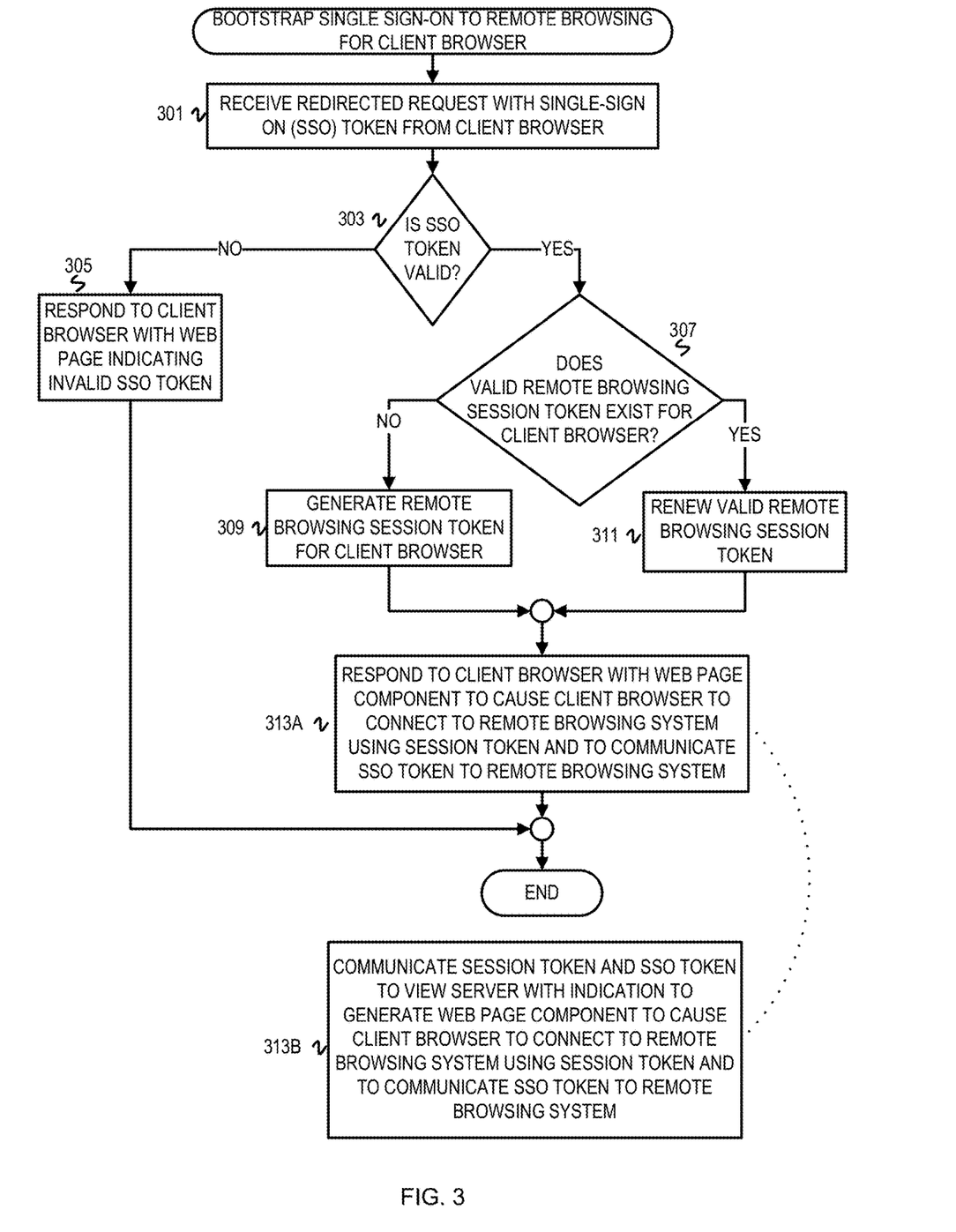
FIG. 3 is a flowchart of example operations for bootstrapping single sign-on to remote browsing for a client browser.
Figure 4:
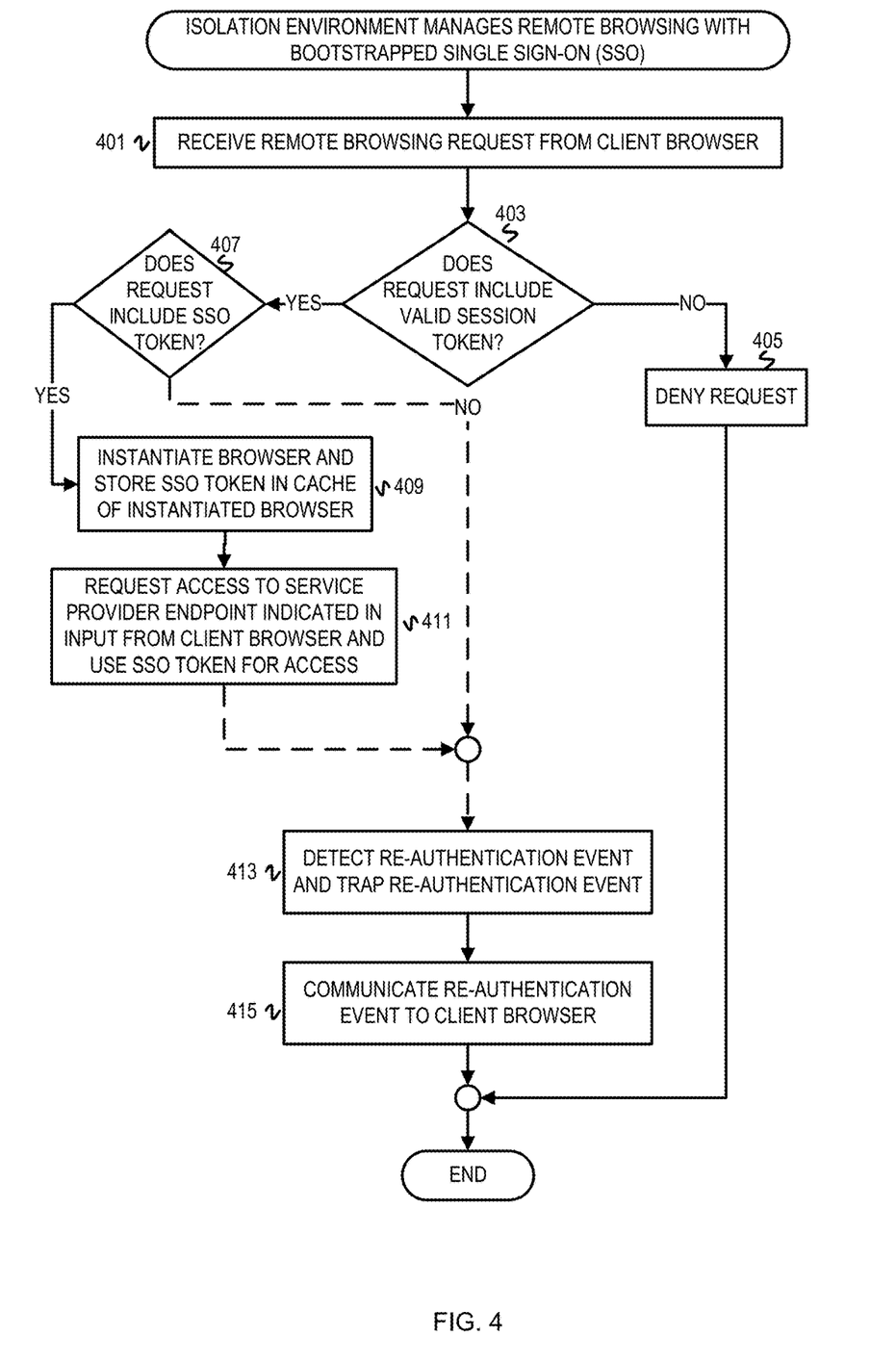

While the diagrams of FIGS. 1-2 provide example context to aid in understanding the disclosed technology, the scope of the claims are not limited to what is depicted. FIGS. 3-4 are flowcharts with example operations that reinforce the example deployment in FIGS. 1-2 should not limit claims scope. FIGS. 3-4 also provide more details of operations to aid in understanding the technology. For consistency with the earlier figures, FIG. 3 refers to a bootstrap server as performing the example operations and FIG. 4 refers to an isolation environment of a remote browsing system as performing the example operations. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for bootstrapping single sign-on to remote browsing for a client browser. The bootstrapping program code would be running on a server of an organization offering the service for remote browsing with SSO.

At block 301, a bootstrap server receives a redirected request with an SSO token for a client browser. A user may have logged into a portal of an identity provider or attempted to visit an endpoint that redirected to the identity provider, which then redirected to the bootstrap server. In other implementations, a security appliance (e.g., a firewall) is configured to route a SSO response from an identity provider (e.g., a SAML assertion) to the bootstrap server. For example, a rule can be configured on a firewall that specifies a network address or range of network addresses of an identity provider for intercepting and analyzing to determine whether the traffic is a SSO response. If the traffic matches the rule, then the firewall routes the SSO response to the bootstrap server.

At block 303, the bootstrap server determines whether the SSO token is valid. If a session (as evidenced by a cookie in the redirected request) does not exist between a client browser that sent the request and the bootstrap server, then the bootstrap server would validate the SSO token with the identity provider. If a valid session exists between the bootstrap server and the client browser, then the bootstrap server treats the SSO token as valid unless programming or a security policy dictates otherwise, in which case the bootstrap server would validate with the identity provider. If the SSO token is valid, then operational flow proceeds to block 307. If the SSO token is not valid, then operational flow proceeds to block 305.

At block 305, the bootstrap server responds to the client browser with a web page indicating that the SSO token is invalid. The bootstrap server can return a code that a resource is not available or cannot be accessed. Operational flow for FIG. 3 ends after block 305.

At block 307, the bootstrap server determines whether a valid session token for remote browsing exists for the client browser. The bootstrap server would maintain session information for existing remote browsing sessions for which the bootstrap server has provided a session token, for example in a local database or table. The session information can include expiration time and a unique identifier of the previously provided session token. The session information would associate a session identifier in a cookie that was also provided previously to the client browser. The cookie that indicates state of the session between the bootstrap server and the client browser includes data that relates it to the session token of the remote browsing session. The bootstrap server would lookup the session identifier indicated in a cookie from the client browser. If nothing is found, then there is no existing valid remote browsing session. If there is a valid remote browsing session for the client browser, then operational flow proceeds to block 311. If there is not a valid remote browsing session for the client browser, then operational flow proceeds to block 309.

At block 309, the bootstrap server generates a remote browsing session token for the client browser that is signed by the bootstrap server. For example, the bootstrap server can generate an object with a unique identifier and then digitally sign the object to generate the session token. Operational flow proceeds to block 313A.

If the bootstrap server determined that the client had a valid remote browsing session (307), then the bootstrap server renews the valid remote browsing session token at block 311. The bootstrap server locates the unique identifier of the remote browsing session in the remote browsing session table or database maintained by the bootstrap server. The entry for the unique identifier includes an expiration time that is extended by the bootstrap server to renew the session token. The bootstrap server would then provide the same session token but update the session table/database time of issuance.

At block 313A, the bootstrap server responds to the client browser with a web page component to cause the client browser to connect to a remote browsing system using the session token and to communicate the SSO token to the remote browsing system. The web page component can include program code (e.g., a script) to be run by the client browser or reference program code to be run by the client browser to cause the client browser to open a connection with a remote browsing system. For example, the script can be run to create a socket and establish a connection with a remote browsing system specified in the script. The socket based connections would carry the inputs from the client browser to the outputs of the isolation environment of the remote browsing system. After the connection is established, the script would cause the client browser to communicate a HTTP request that includes the remote browsing session token provided by the bootstrap server. The script would also cause the client browser to embed the SSO token into the body of the HTTP message.

In some cases, a view server would be employed to reduce the responsibility of the bootstrap server. Block 313B is an alternative to 313A. At block 313B, the bootstrap server communicates the session token and the SSO token to a view server. The communication includes an indication to generate the previously described web page component.

FIG. 4 is a flowchart of example operations for managing remote browsing with bootstrapped single sign-on. An isolation environment that isolates the remote browser will be programmed to validate a remote browsing session, extract a SSO token conveyed as payload to the isolation environment, and trap re-authentication events intended for the remote browser for conveyance back to the client browser.

At block 401, an isolation environment receives a remote browsing request from a client browser. The isolation environment can process messages typically received by a browser. In addition, the isolation environment translates inputs from the client browser into inputs for the remote browser. For instance, the isolation environment maps pixel-based inputs to document objects (e.g., a button or link) and can create an event (e.g., click or select). The translation of client browser inputs depends upon how the content is sanitized for the client browser. However, some inputs (e.g., a HTTP GET request that specifies a URL) from the client browser can be conveyed without translation, such as a request to navigate to a URL.

At block 403, the isolation environment determines whether the request includes a valid session token. The isolation environment will have access to keys or a secret previously shared by certificate distribution, for example. With this, the isolation environment can validate the signature on the session token. If the session token is valid, then operational flow proceeds to block 407. If not, the request is denied (block 405) and operational flow ends.

At block 407, the isolation environment determines whether the request includes a SSO token. The isolation environment will be programmed or configured to search the body of the request for a SSO token. If the request does not include a SSO token, then remote browsing may continue to endpoints or domains that do not require authentication (i.e., until flow proceeds to block 413). If the request includes a SSO token, then operational flow proceeds to block 409.

At block 409, the isolation environment instantiates a browser and stores the SSO token into the browser cache. In some cases, a browser will already be instantiated in the isolation environment.

At block 411, the browser in the isolation environment requests access to a service provider endpoint indicated in input from a client browser. During the authentication exchange with the service provider endpoints, the browser will provide the SSO token.

A dashed line is depicted from blocks 407 and 411 to block 413 since synchronous flow is not necessary. Inputs may be non-navigating inputs that interact with a web page and a navigation input may not access a protected resources that requires authentication for authorization to access. At block 413, the isolation environment detects a re-authentication event and traps the re-authentication event. The re-authentication event may be communicated by a service endpoint because of a change in authentication requirements, expiration of the SSO token, navigation to a different service provider endpoint, etc. When the isolation environment detects the re-authentication event, the isolation environment traps the re-authentication event to prevent delivery to the contained browser. The isolation environment may cache the re-authentication event until the client browser responds with a new SSO token and then deliver the re-authentication event to the browser.

At block 415, the isolation environment communicates the re-authentication event to the client browser. If the re-authentication event is communicated from a service provider endpoint as a HTTP message, the isolation environment can forward the message to the client browser, which should redirect the client browser to the identity provider.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
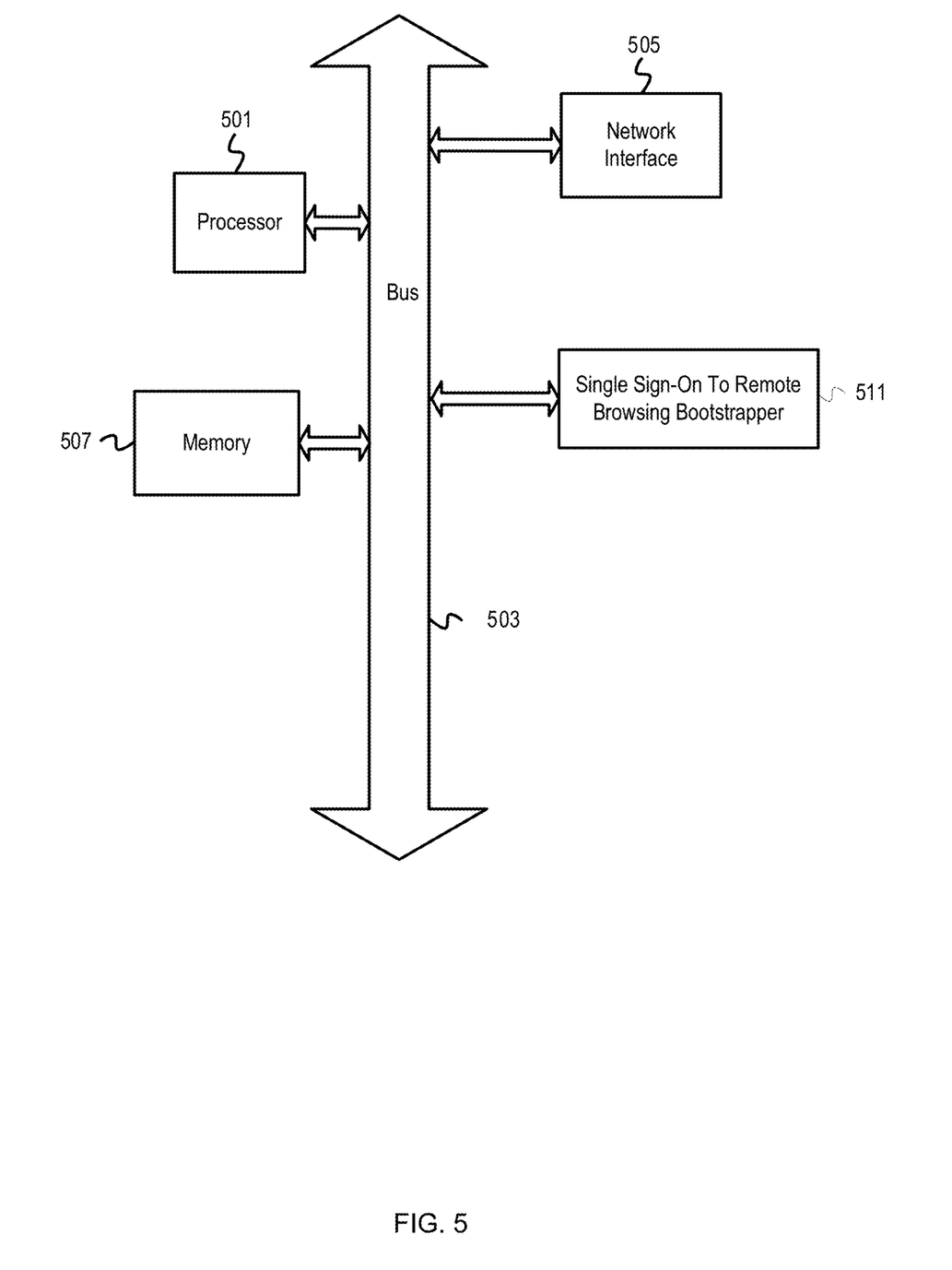
FIG. 5 depicts an example computer system with single sign-on to remote browsing bootstrapper.

FIG. 5 depicts an example computer system with single sign-on to remote browsing bootstrapper. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a SSO to remote browsing bootstrapper 511 ("the bootstrapper"). The bootstrapper 511 conveys a SSO token (e.g., SAML assertion) through a remote browsing session to a remote browser to allow remote browsing with the seamless SSO experience. The bootstrapper 511 conveys the SSO token based on overlapping trust relationships: 1) established trust between the bootstrapper 511 and a remote browsing system and 2) established trust between the bootstrapper 511 and an identity provider. The bootstrapper 511 relates these different spheres of trust by directing a client browser to establish a remote browsing session with a session token provided by the bootstrapper 511 and conveying the SSO token to the remote browser using the remote browsing session. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:
   based on receipt of a redirected request from a client browser, determining whether the redirected request includes a single-sign on (SSO) token that is valid;
   based on a determination that the redirected request includes a valid SSO token,
      determining whether the redirected request includes a valid cookie for the client browser;
      based on a determination that the redirected request does not include a valid cookie, generating a session token;
      based on a determination that the redirected request includes a valid cookie for the client browser, renewing a session token;
   generating and transmitting a communication that causes the client browser to request a remote browsing session with the session token and to include the SSO token in the request; and
   based on validating the session token by a remote browsing system, establishing a remote browsing session between the client browser and a remote browser and providing the SSO token for use by the remote browser to access a service provider endpoint.

2. The method of claim 1, wherein the redirected request was redirected by an identity provider that generated the SSO token or a security appliance that intercepted the redirected request from the identity provider and routed the redirected request to a server or service, wherein generating and transmitting a communication that causes the client browser to request a remote browsing session with the session token and to include the SSO token in the request is performed by the server or service.

3. The method of claim 1, wherein generating the communication that causes the client browser to request the remote browsing session comprises generating a web page component with program code to connect the client browser to the remote browsing system with the session token and to include the SSO token as payload in the remote browsing session request, wherein transmitting the communication comprises responding to the redirected request with the web page component, the session token, and the SSO token.

4. The method of claim 3, wherein generating the web page component with program code to cause the client browser to include the SSO token as payload in the remote browsing session request comprises generating the web page component with program code to include the SSO token in a body of the remote browsing session request.

5. The method of claim 1, wherein generating the communication that causes the client browser to request the remote browsing session comprises communicating to a view server an indication to generate a web page component with program code to connect the client browser to the remote browsing system with the session token and to include the SSO token as payload in the remote browsing session request.

6. The method of claim 1 further comprising:
the remote browsing system,
trapping a re-authentication event received at the remote browser;
communicating the re-authentication event to the client browser; and
generating a new session token or renewing the session token depending on whether the client browser presents a valid cookie after the client browser obtains a second SSO token from an identity provider.

7. The method of claim 6, wherein the re-authentication event indicates multi-factor authentication and wherein the client browser obtained the second SSO token based on interacting with the identity provider to satisfy the indicated multi-factor authentication.

8. The method of claim 1 further comprising redirecting the client browser to an identity provider based on a determination that the SSO token is not valid.

9. A non-transitory, machine-readable medium having program code stored thereon, the program code comprising instructions to:
based on receipt of a redirected request from a client browser, determine whether the redirected request includes a single-sign on (SSO) token that is valid;
based on a determination that the redirected request includes a valid SSO token,
determine whether the redirected request includes a valid cookie for the client browser;
based on a determination that the redirected request does not include a valid cookie, generate a session token;
based on a determination that the redirected request includes a valid cookie for the client browser, renew a session token; and
generate a web page component with second program code to connect the client browser to a remote browsing system with the session token and to include the SSO token as payload in the remote browsing session request.

10. The non-transitory, machine-readable medium of claim 9 having stored thereon third program code comprising instructions to cause the remote browsing system to provide the SSO token for use by a remote browser to access a service provider endpoint after the remote browsing system validates the session token.

11. The non-transitory, machine-readable medium of claim 10, wherein the third program code further comprises instructions to:
trap a re-authentication event received at the remote browser; and
communicate the re-authentication event to the client browser.

12. The machine-readable medium of claim 9, wherein the second program code comprises instructions to include the SSO token in a body of the remote browsing session request to be sent by the client browser.

13. The machine-readable medium of claim 9, wherein the program code further comprises instructions to redirect the client browser to an identity provider based on a determination that the SSO token is not valid.

14. A system comprising:
a first server programmed with first program code to,
based on receipt of a redirected request from a client browser, determine whether the redirected request includes a single-sign on (SSO) token that is valid;
based on a determination that the redirected request includes a valid SSO token,
determine whether the redirected request includes a valid cookie for the client browser;
based on a determination that the redirected request does not include a valid cookie, generate a session token;
based on a determination that the redirected request includes a valid cookie for the client browser, renew a session token;
generate and transmit a communication that causes the client browser to request a remote browsing session with the session token and to include the SSO token in the request; and
a second server programmed with second program code to,
provide the SSO token for use by a remote browser to access a service provider endpoint after establishing the remote browsing session based on validating the session token,
wherein the first and second servers comprise hardware servers.

15. The system of claim 14, wherein the first server comprises a first processor and a first memory having stored thereon the first program code executable by the first processor and the second server comprises a second processor and second memory having stored thereon the second program code.

16. The system of claim 14, wherein instructions of the first program code to generate the communication that causes the client browser to request the remote browsing session comprise instructions executable to cause the first server to generate a web page component with third program code that the client browser runs to connect the client browser to a remote browsing system with the session token and to include the SSO token as payload in the remote browsing session request, wherein instructions of the first program code to transmit the communication comprise instructions executable to cause the first server to respond to the redirected request with the web page component, the session token, and the SSO token.

17. The system of claim 16, wherein the third program code causes the client browser to include the SSO token in a body of the remote browsing session request when run by the client browser.

18. The system of claim 16, wherein instructions of the first program code to generate the communication that causes the client browser to request the remote browsing session comprise instructions executable to cause the first server to communicate to a view server an indication to generate a web page component with the third program code to, when run by the client browser, connect the client browser to a remote browsing system with the session token and to include the SSO token as payload in the remote browsing session request.

19. The system of claim 14, wherein the second program code further comprises instructions executable by the second server to:

trap a re-authentication event received at the remote browser; and communicate the re-authentication event to the client browser.

20. The system of claim 14, wherein the first program code further comprises instructions executable to cause the first server to redirect the client browser to an identity provider based on a determination that the SSO token is not valid.

* * * * *